Oct. 21, 1958

M. T. GOETZ 2,857,459

TAPE TRANSMITTER

Filed July 11, 1955

6 Sheets-Sheet 1

INVENTOR
MAURUS T. GOETZ

BY Emery Robinson
ATTORNEY

Oct. 21, 1958 M. T. GOETZ 2,857,459

TAPE TRANSMITTER

Filed July 11, 1955 6 Sheets-Sheet 2

INVENTOR
MAURUS T. GOETZ
BY Emery Robinson
ATTORNEY

INVENTOR
MAURUS T. GOETZ
BY Emery Robinson
ATTORNEY

Oct. 21, 1958

M. T. GOETZ 2,857,459

TAPE TRANSMITTER

Filed July 11, 1955

6 Sheets-Sheet 4

INVENTOR
MAURUS T. GOETZ

BY Emery Robinson
ATTORNEY

Oct. 21, 1958

M. T. GOETZ 2,857,459

TAPE TRANSMITTER

Filed July 11, 1955

6 Sheets-Sheet 5

INVENTOR
MAURUS T. GOETZ

BY Emery Robinson

ATTORNEY

Oct. 21, 1958 M. T. GOETZ 2,857,459

TAPE TRANSMITTER

Filed July 11, 1955 6 Sheets-Sheet 6

INVENTOR
MAURUS T. GOETZ
BY Emery Robinson
ATTORNEY

United States Patent Office
2,857,459
Patented Oct. 21, 1958

2,857,459

TAPE TRANSMITTER

Maurus T. Goetz, Chicago, Ill., assignor, by mesne assignments, to Fairchild Graphic Equipment, Inc., a corporation of New York Application July 11, 1955, Serial No. 521,007

12 Claims. (Cl. 178—17)

This invention relates to telegraph transmission systems and more particularly to a variable sequence transmission system and control arrangements therefor.

The primary object of the invention is to provide means for automatically rearranging data derived from a perforated record strip.

Another object of the invention is to provide an arrangement for automatically transposing data recorded in accordance with one predetermined sequence into a second predetermined sequence.

A further object of the invention is to provide a mechanism which will read intelligence in two locations in a tape simultaneously, and which will deliver that intelligence to some output device in a different sequence than that in which the intelligence is perforated in the tape.

In the fields of telegraph transmission, automatic typewriter operation, and automatic control of typesetting mechanisms, there are some instances in which data becomes available in one sequence, but must be employed in the control of the foregoing systems and apparatus in a different sequence. For example, in preparing a tape for setting telephone directory composition, the exchange is perforated at the beginning of a line for operating convenience but must be set in type in its usual location at the end of a line. Then, with the double-reading apparatus according to the present invention, the information appearing in the tape is rearranged so that said information may be delivered to some output device (such as a typesetting machine) in the proper sequence. Accordingly, the present invention contemplates a system wherein it is desired to change the sequence of matter perforated in a tape, so that matter last perforated will be first transmitted by the tape reader or sensing device, said system comprising a double-reading pivoted transmitter adapted to read simultaneously two portions of the perforated tape, and relay controlled means responsive to predetermined control signals in the tape for governing the sequence of transmission of said perforated matter. Another application of the present invention resides in the control of the add-thin-space over a telegraph circuit. In this operation the need for extra spacing is determined after the line has been perforated in the tape, but it is desirable to transmit the information at the beginning of the line so that the equipment being controlled may be properly conditioned before the line is processed. A further application of the invention resides in the control of justifying typewriters, wherein the setting of the justification mechanism can be determined only after the line has been perforated, but must be employed at the beginning of the line in order to achieve justification.

A better understanding of the present invention may be had from the following description, taken in conjunction with the accompanying drawings, wherein.

Figure 5:
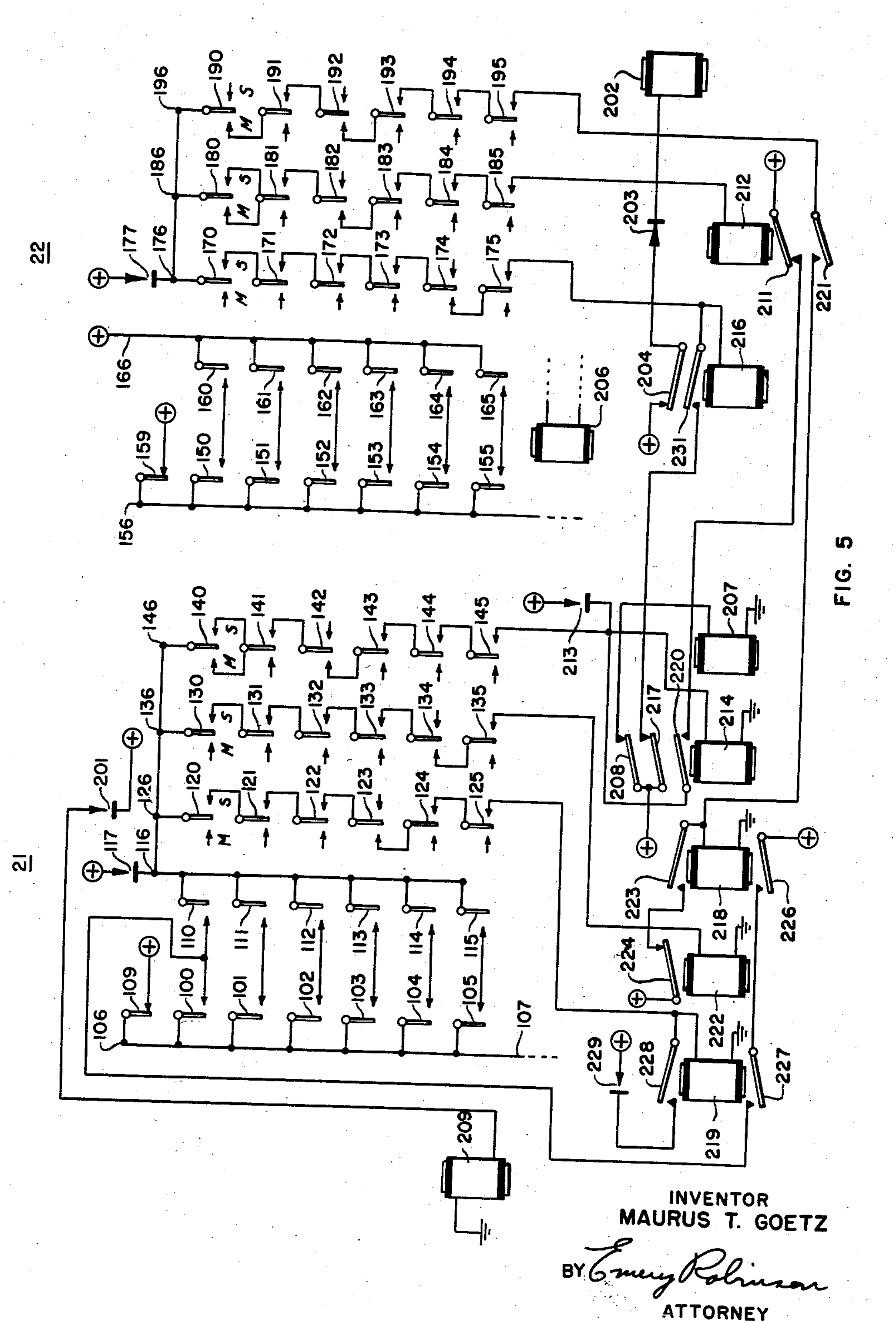
Fig. 5 is an electrical circuit arrangement for the double-reading transmitter shown in Figs. 1 to 5, when adapted for add-thin-space transmission.
Figure 6:
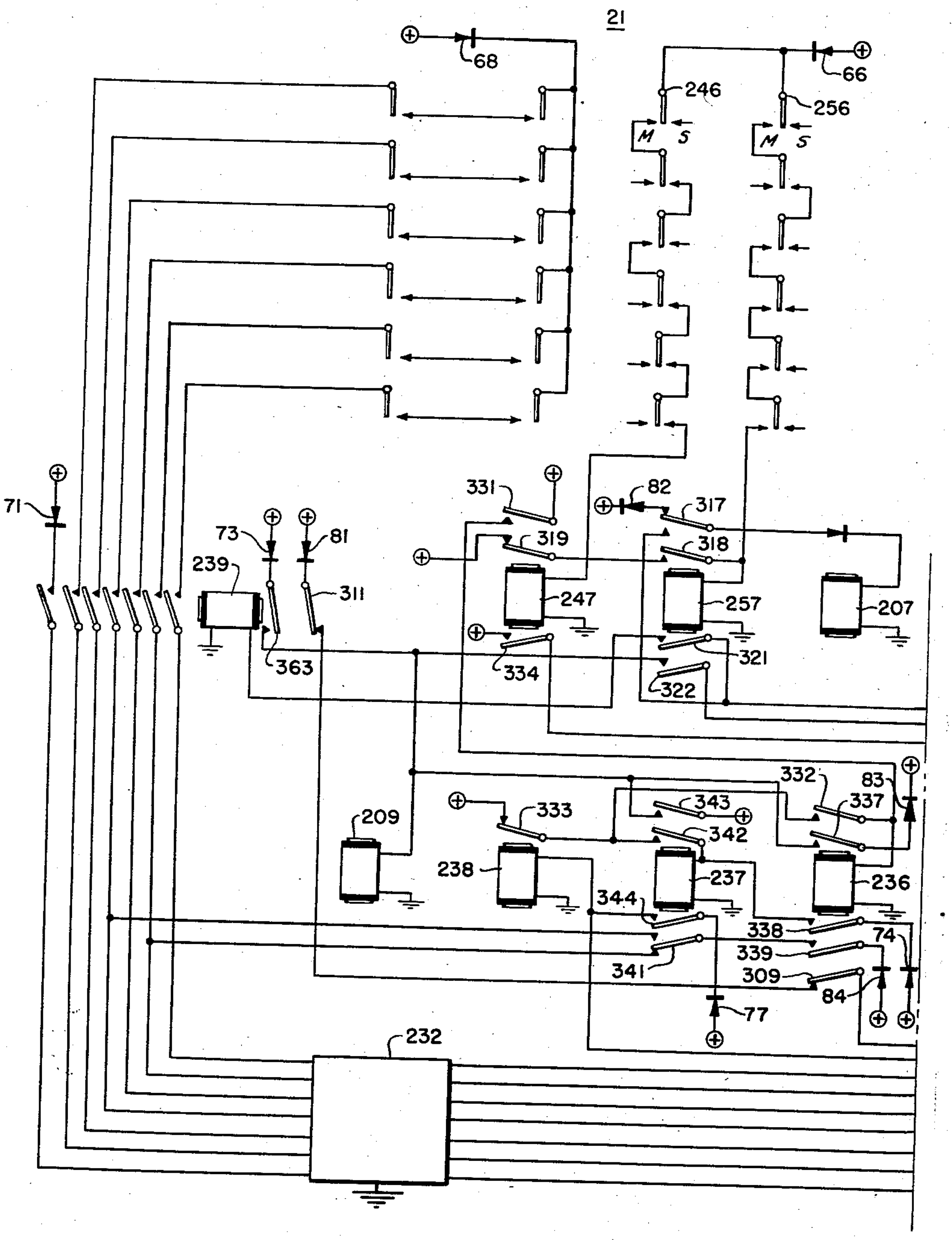
Figure 7:
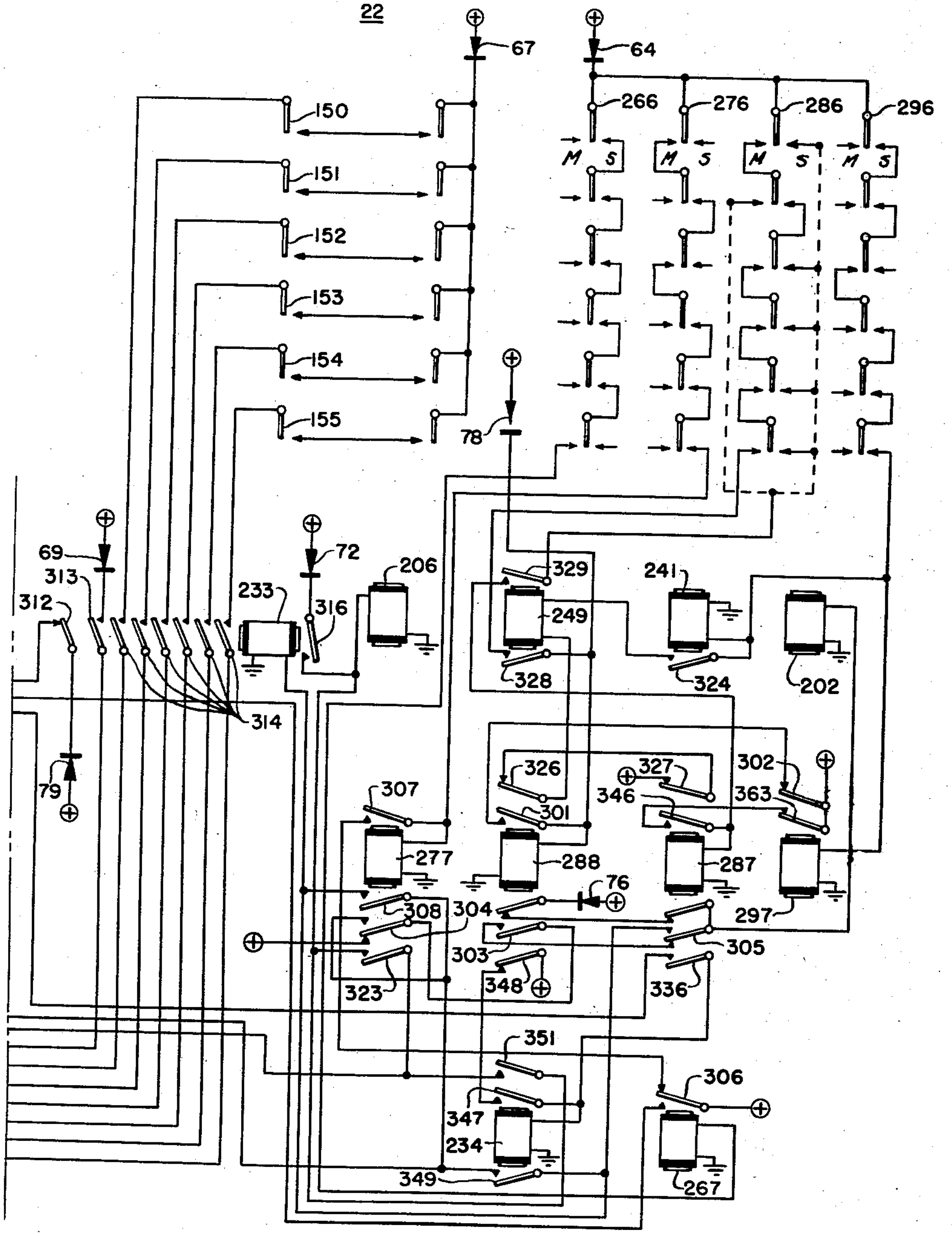
Figure 8:
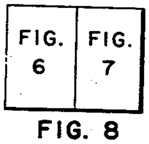
Figure 9:
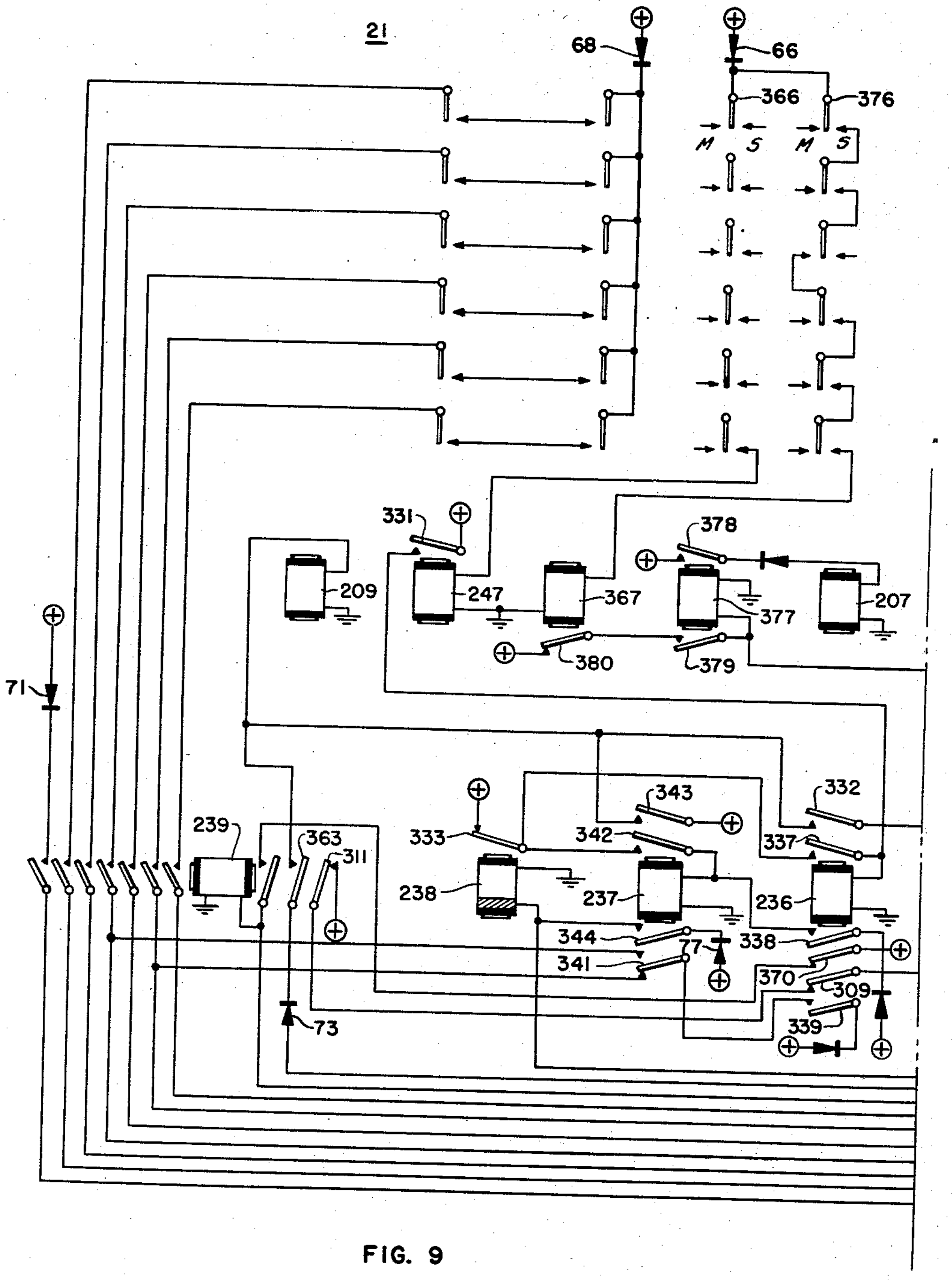
Figures 10, 11:
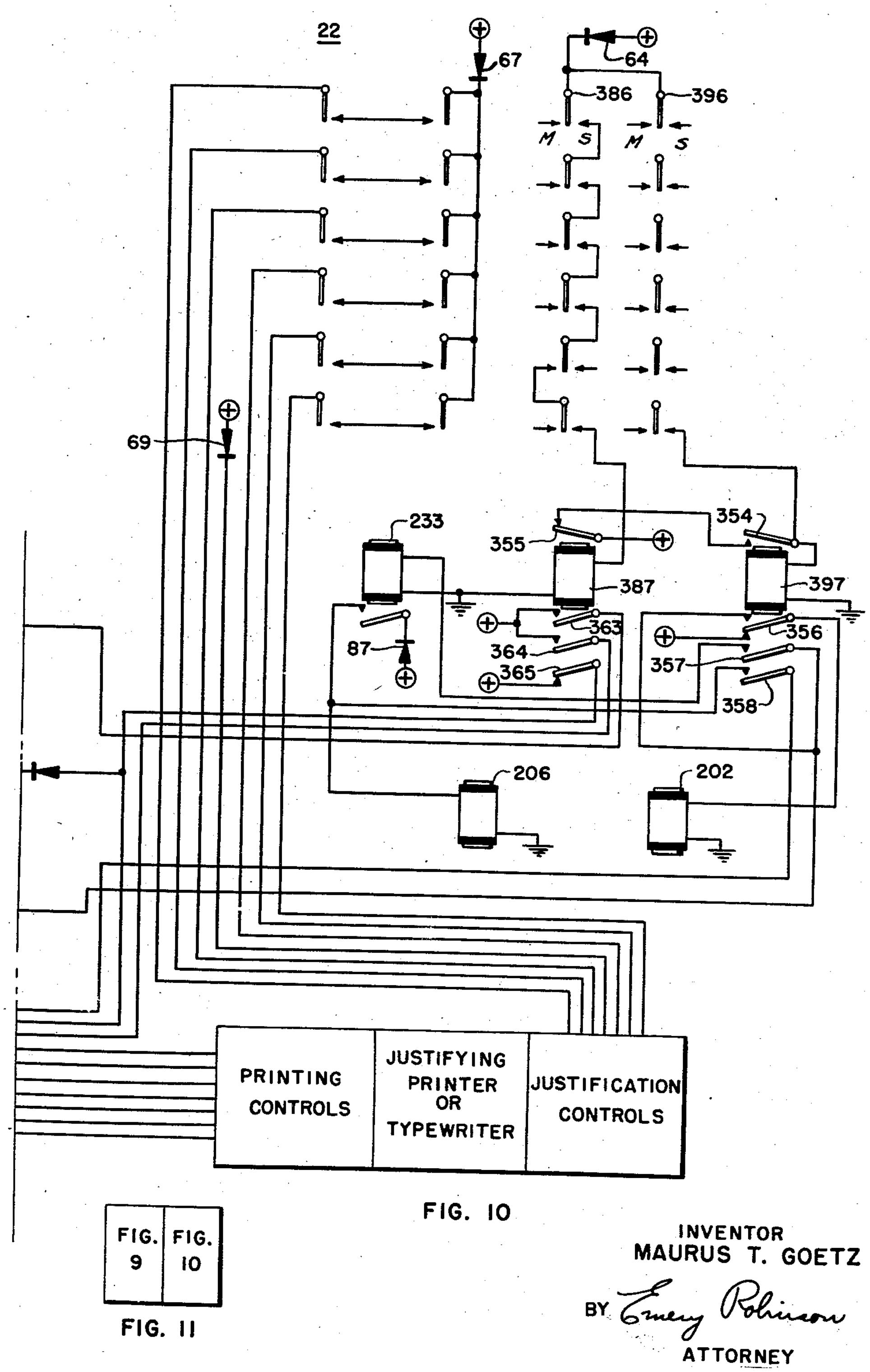

Figs. 6 and 7 comprise an electrical circuit arrangement for the double-reading transmitter shown in Figs. 1 to 5, when adapted for telephone directory composition;

Fig. 8 is a view showing the relative arrangement of Figs. 6 and 7;

Figs. 9 and 10 comprise an electrical circuit arrangement for the double-reading transmitter shown in Figs. 1 to 5, when adapted for controlling justifying typewriters; and Fig. 11 is a view showing the relative arrangement of Figs. 9 and 10.

Figure 1:
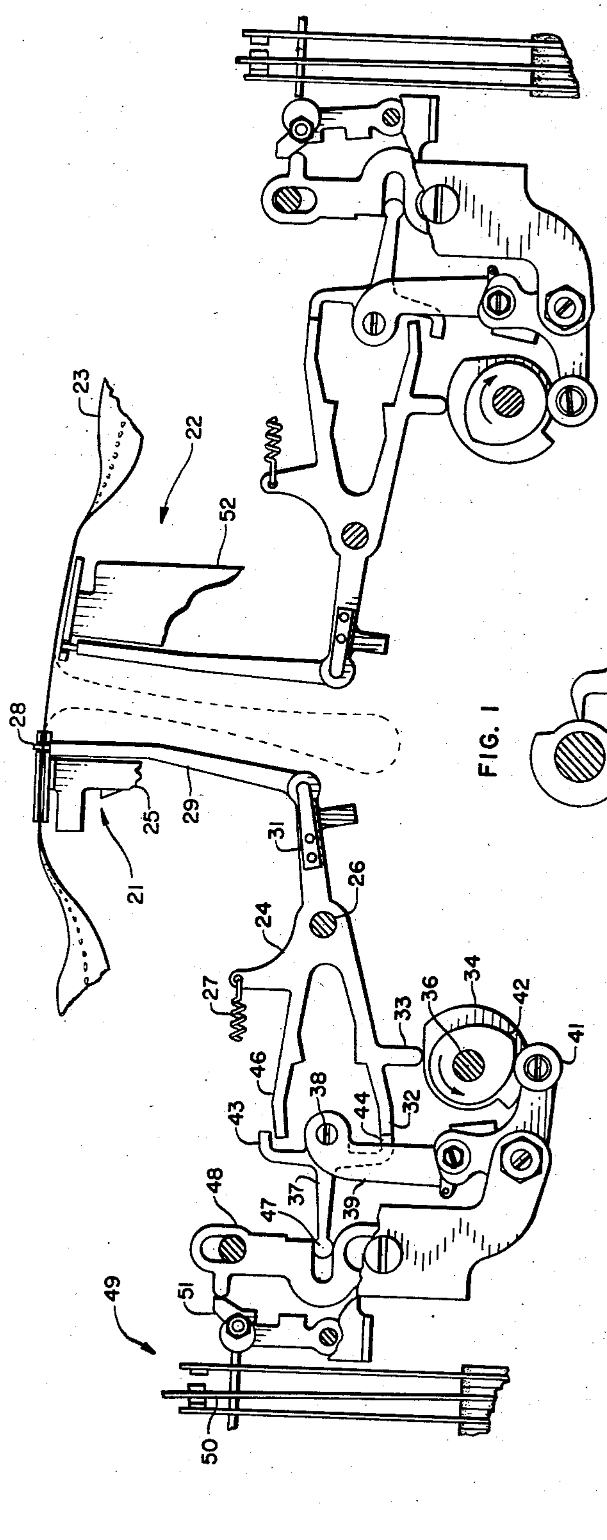
Fig. 1 is a view showing the relative positionments of the tape reading devices in the double-reading tape transmitter according to the present invention.
Figure 4:
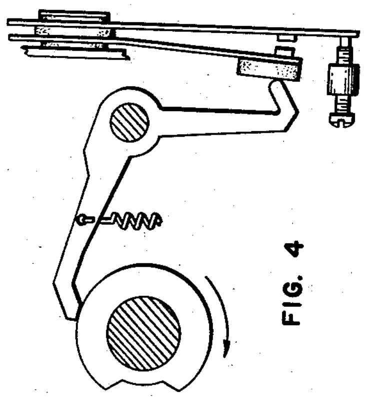
Fig. 4 is a view showing the distributor contact cam arrangement for the fixed tape reader portion of the device shown in Fig. 1.
Figure 3:
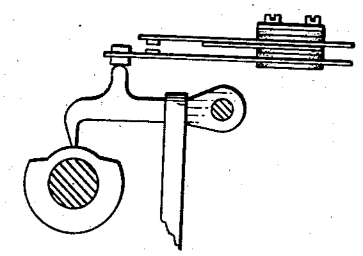
Fig. 3 is a view showing the auxiliary timing contact cam arrangement associated with the transmitter cam assemblies shown in Fig. 1.

The basic mechanism as shown in Fig. 1 consists of two tape reading devices of the type that are more completely described in United States Patent No. 2,262,012, granted to Ross A. Lake on November 11, 1941, and United States Patent No. 2,348,214, granted May 9, 1944, to Erwin A. Gubisch.

A pivoted reader 21 and a stationary reader 22 are so positioned as to be both capable of simultaneously sensing the coded intelligence on the tape 23. As is disclosed in the afore-mentioned patents, one of the characteristics of this type of reader is its ability to sense the perforations immediately adjacent the punch block when used in conjunction with a typing reperforator. In the present invention the fixed reader 22 is substituted for the punch block and is a mirror image of the pivoted reader 21. In this manner it is possible to sense two code perforations occurring adjacent in the tape.

Referring to Fig. 1, the frame 25 of the pivoted reader 21 is pivotally mounted as to allow the reader 21 to operate through a predetermined arc as is more fully described in the afore-mentioned Lake or Gubisch patents. Sensing control levers 24 are pivotally mounted on the shaft 26 and urged to rotate in a counterclockwise direction (Fig. 1) by their associated springs 27. The sensing fingers 28 are suitably positioned on the sensing arms 29 which are pivotally attached to the extensions 31 of the sensing control levers 24. It is, of course, understood that while only one sensing unit is shown, there is an exact replica for each unit of the code to be used in a particular application of this invention.

Movement of the control sensing levers 24 is imparted by the association of the extensions 33 with the cams 34 which are mounted on and rotated by the selectably rotated shaft 36.

A plurality of sword levers 37 are mounted on a shaft 38 which is mounted in a pivoted lever 39. A cam roller 41 is positioned on one end of the lever 39 so as to be associated with a second cam 42 which is driven by the shaft 36. The sword levers 37 are so constructed as to be pivoted, in a manner to be described, in a direction controlled by the cooperation of the forward extensions 43 and 44 of the sword levers 37 and the arms 32 and 46 of the sensing control levers. As the swords are pivoted, the motion is transmitted into an up or down motion of the ball extensions 47 and thereby to the cam lever 48 to open or close the associated contact 49 through cooperation with the interponent 51.

After the tape 26 has been positioned by the tape advancing mechanism, the extension 33 will have dropped off of the high portion of the cam 34 causing the sensing control lever 24 to be rotated counterclockwise by its spring 27. As extension 31 moves counterclockwise (Fig. 1), the sensing arm 29 and sensing fingers 28 are urged up toward the tape 26. If a perforation is presented to the finger 28, the sensing control lever 24 will be allowed to rotate to the position shown in Fig. 1 so that its lower extension 32 is opposite the lower forward extension 44 of the sword lever 37. While the sensing control lever is so positioned, the cam 42, through cooperation with the roller 41, causes the pivoted lever 39 to be rotated in a clockwise (Fig. 1) direction to move the sword lever 37 toward the sensing control lever 24. When the lower extension 44 of the sword lever 37 contacts the lower arm 32 of the sensing control lever 24, the sword lever 37 is rotated clockwise (Fig. 1) about its pivot 38. The rotation of the ball extension 47 moves the cam slide 48 up and thereby closes the associated contact 49 through cooperation of the interponent 51. The above-described positioning is that shown in Fig. 1.

The stationary reader 22 is a mirror image of the pivoted reader 21 which has been described in the foregoing paragraphs. The stationary reader 22, of course, has a rigid frame 52 and the tape is advanced from right to left as viewed in Fig. 1.

Figure 2:
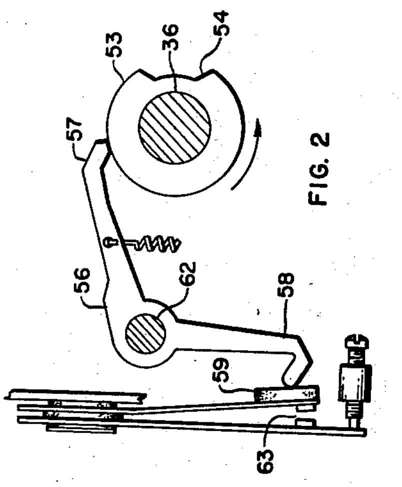
Fig. 2 is a view showing the distributor contact cam arrangement for the pivoted tape reader portion of the device shown in Fig. 1.

The sequential distributor is of the type disclosed in the afore-mentioned Gubisch patent. An assembly such as that shown in Fig. 2 is associated with each code contact. The cams 53 are arranged on the shaft 36 so as to sequentially present the low portions 54 of the cams 53 to their associated follower arms 57 of the pivotally mounted bell crank 56. As the follower arm 57 is presented to the low portion 54, the bell crank 56 is rotated clockwise (Fig. 2) about its pivot 62 to move the lower extension 58 against the insulating block 59 to thereby close the contact to complete the circuit from the transmitting contacts 50 to the telegraph line.

*Add thin space*

In the operation of typesetting equipment by perforated tape there has always been the problem of justifying the lines to the required length. It is quite apparent that the amount of justification or addition of thin spaces can only be determined after most of the line has been perforated. It is equally apparent that in employing the perforated strip the add-thin-space intelligence must become effective prior to the selection of the first spaceband in the line. In the past, this has been done by reperforating the tape or by modifying the spacebands by turning back to each spaceband and striking a suitable key. In the present invention, the add-thin-space operation is accomplished in one operation by the utilization of the double-reading tape transmitter shown in Fig. 1 which will allow the operator to perforate a control code at the end of a line and render this control code effective prior to the time the text material code perforations are employed, either in actual transmission or typesetting. To accomplish the foregoing purpose, the double-reading transmitter of Fig. 1 is controlled by the circuit shown in Fig. 5, by having the stationary reader 22 read the perforated strip, not for the purpose of transmission, but for the purpose of conditioning the pivoted reader 21 to add the required spacing in the code which it transmits. At the end of the line, the stationary reader 22 will stop reading and start the pivoted reader in operation to read and transmit and will not be reactivated until reader 22 has completed the processing of the line.

Referring now to Fig. 5, the reading and distributing contacts associated with the pivoted reader 21 of Fig. 1 are shown on the left-hand portion of Fig. 5 while those associated with the stationary reader 22 are shown in the right-hand portion. Since the embodiment presently under consideration is for use with a perforated tape such as that used by Teletypesetter equipment the diagram illustrates circuitry for a six unit code.

The reader clutch magnet 202 of the stationary reader 22 is connected to positive battery through the manual switch 203 and the normally closed contact 204. The distributor clutch 206 is not shown connected in Fig. 5 because the distributor portion of the stationary reader 22 is not used in this particular embodiment of the invention. The reader clutch magnet 207 for the pivoted reader 21 is connected to positive battery through normally closed contact 208 while the distributor clutch magnet 209 is selectively connected to positive battery through the timing contact 201.

In describing the operations of this invention as controlled by a six element code, the first element of the code shall be designated as code unit zero, the second element as code unit one, the third element as code unit two, the fourth element as code unit three, the fifth element as code unit four, and the sixth element as code unit five. These designations will be used throughout the specification. It will be noted that the code controlled contacts have been numbered so that the last digit of the numeral corresponds to the code unit controlling each contact.

In this embodiment, the three series of reading contacts 176, 186, and 196, are wired as to recognize "carriage return" (code unit 4 marking), either "line feed" (code unit 2 marking), or "special control" (code units 0 and 2 marking), and "special control" respectively, for purposes that will subsequently be fully explained.

In the pivoted reader 21 the series of reading contacts 126, 136, and 146, are wired to recognize "space" (code unit 3 marking), "carriage return" (4 marking), and either "line feed" (2 marking) or "special control" (0 and 2 marking) respectively.

The first step in operation of this system is preparation of an appropriately perforated tape. This tape is so punched that the lines requiring the addition of thin spaces will terminate with the sequence "carriage return" (4 marking) and the "special control" (0 and 2 marking). After momentarily closing the contact 213 to energize 214 and remove operating battery from the reader clutch 207, the tape is placed on the double-reading transmitter so that the perforation preceding the first character perforation of the first line is over the sensing pins 28 of pivoted reader 21 (Fig. 1) and so that the carriage return signal at the end of that same line is over the sensing pins of the stationary reader 22. During the installation of the tape, the switch 203 is open so operating battery is removed from the clutch magnet 202. The tape is positioned one position prior to the beginning of the line and the line feed signal because the timing is such that the tape will be advanced one character perforation at the beginning of the operating cycle of either reader.

The momentary closing of the manual switch 213 will energize the relay 214 causing the normally open contact 220 to close and complete a locking path through the break contact 211. The manual switch 203 is now closed, thereby energizing the stationary reader clutch 202 and advancing the tape as described above to put the line feed perforation over the sensing pins of the stationary reader 22. If this is a normal "line feed" signal (2 marking), the stationary reader reading contacts controlled by 0, 1, 3, 4 and 5 units will be moved to the right (Fig. 5) to their spacing position while those contacts controlled by the number 2 code unit will be moved to the left to their marking position. It will be noted from Fig. 5 that this will complete a path though the reading circuit 186 to the relay 212 thereby putting positive battery on the relay 212 through the timing contact 177 for the duration of the operation of the timing contact. Energization of the relay 212 causes normally closed contact 211 to be opened and thereby to open the locking path to the relay 214 and causing it to release. When the relay 214 releases, it causes the break contact 208 to close and establish a path from positive battery to the reader clutch 207. At the same time, the normally closed break contact 217 establishes a locking path from positive battery for the relay 216 to thereby condition relay 216 to be operated by the carriage return code combination through contacts 176.

Energization of the clutch magnet 207 causes the clutch of the pivoted reader transmitter 21 to be engaged and to sense the perforations as earlier described. The storage series of contact 116 corresponds to the transmitting contacts 50 exemplified by the sequential distributing mechanism of Fig. 1, the signals being sent out over the line 107 to the telegraph line or whatever equipment it may be transmitted to.

The normal transmission of the pivoted reader-transmitter 21 continues until reading contact series 146 recognizes either the line feed code (2 marking) or the special control code (0 and 2 marking) which signifies the end of the line. Either of the aforementioned signals will establish a path from positive battery through the timing contact 117 to the relay 214. The relay 214 operates and is locked up through the contact 211 at relay 212. Energization of the relay 214 causes the normally closed contact 208 to open to de-energize the clutch magnet 207 and thereby stops the pivoted reader-transmitter 21. At the same time, the contact 217 is opened by the relay 214 and thereby unlocks the relay 216. The normal or unmodified operation of the pivoted reader 21 has been described. The pivoted reader may modify each space code (3 marking) to the special add-fixed space code (0 and 3 marking) under control of the relays 218 and 219. The operation of the invention to modify the perforated message will now be described.

When the pivoted reader-transmitter 21 recognizes the line feed (2 marking) at the end of the line and unlocks the relay 216 as described above, the contacts 204 will again complete the path from positive battery to the stationary reader clutch magnet 202 thereby putting the stationary reader 22 in operating condition to once again sense the tape. When the special control signal (0 and 2 marking) is sensed by the stationary reader 22, a path is completed from positive battery through the timing contact 177 and the reading contacts 186 to the relay 212. The reading contact series 186 is wired to recognize either line feed or special control and the results of the completion of a path through contacts 186 is fully described above.

Energization of the relay 212 also closes the contact 221 to complete a path from the reading contact series 196 to the relay 218. The reading contact series 196 is wired to recognize the special control code only. In addition to the circuit completed through the series 186, a path will also be completed from positive battery through timing contact 177 to the relay 218. Relay 218 is operated and is locked up through contacts 223 and 224 to positive battery. Energization of the relay 218 closes the contact 226 and prepares a path from positive battery to the contact 227 on the relay 219 which will have the ultimate function of adding a zero code unit to each "space" combination sensed for the duration of the line.

Since it is obviously desirable to add the zero impulse only to the "space" combination the relay 219 has been added for this purpose. The reading contact 126 is wired to complete a path from positive battery through the timing contact 117 to the relay 219 when the pivoted reader-transmitter 21 senses the space combination (3 marking). Energization of the relay 219 closes the contact 228 and locks the relay 219 for the duration of the timing contact 229. The timed locking of the relay 219 is for the purpose of insuring that the pulse will be transmitted through contacts 226 and the contact 100 on each space combination. The space combination will thus be modified to 0 and 3 marking (add-thin-space code combination) when it goes out over the line 107.

The above-described operation will continue throughout the line. At the end of the line, the reader-transmitter 21 will sense the carriage return signal which is recognized by the reading contacts 136 to complete a path from positive battery through the timing contacts 117 to the relay 222. Energization of the relay 222 opens contact 224 to break the locking circuit to the relay 218 and restores it to its normal released condition pending reactuation under the control of some subsequent special line feed signal from the stationary reader 22.

From the foregoing description, it is apparent that the two readers are so designated as to operate alternately with one waiting until the other has finished its function on a line before starting to process a line. It will be further noted that the stationary reader having conditioned the pivoted reader as regards the first line will continue to read the second line until it reaches the carriage return signal. When the carriage return signal is sensed by the stationary reader 22 the relay 216 will be energized and locked through the contacts 231 and 217. Energization of the relay 216 causes the contact 204 to open thereby de-energizing the clutch magnet 202. The stationary reader 22 will thus wait for the completion of the first line in the pivoted reader 21 and will be reactivated only when reader 21 senses either line feed or special control which will designate the end of the line and will also energize the relay 214 to open the contact 208 to de-energize the reader clutch magnet 207 and the contact 217 to unlock and de-energize the relay 216 which allows the contact 204 to close to energize the clutch magnet 202.

*Telephone directory tape*

When controlling the setting of a telephone directory by perforated tape, it is desirable to perforate the tape with the telephone exchange and number at the beginning of the line followed by the name and the address and to fill out the line space with the leaders after it is known how much space will be required for the aforementioned information. In order to set type with the exchange and number at its customary place at the end of the line, the double-reading transmitter is employed to transfer the information in its proper sequence to a multiple magnet punch to prepare a tape for type setting.

There are instances in directory setting where the information will not all go on one line. This condition is identified in the trade as a "run-over-line" and requires special handling. The present invention is equipped to identify and handle the run-over line.

The basic problem is the identification and segregation of the telephone exchange and number. To accomplish this purpose, the present invention brackets the exchange and number by two indicator codes which have for purposes of illustration been designated as BX (beginning of exchange) and EX (end of exchange). The carriage return and line feed combination are used as further indicators to facilitate handling and are used in combination with BX to distinguish between normal lines containing exchange and number and "run-over" lines which may not contain a telephone exchange and number. It is, of course, understood that the indicator code combinations may be any convenient combination and that those used in this disclosure are merely for purposes of illustration.

The initial tape is prepared by perforating the tape with the BX code combination, then the telephone exchange and number followed by the code combination EX, the name and address, leaders to complete the line, the carriage return code combination, and line feed combination. The function of the stationary reading transmitter is to transfer the name, address, and leader portion of the master tape to the output tape prior to the telephone exchange being so transferred. To accomplish this, the stationary reading transmitter is actuated by the EX code combination to sense the name and address portion and transfer it to the output tape. At the end of the afore-mentioned portion of tape the stationary reading transmitter senses the carriage return signal, which signal disassociates the stationary reader transmitter from the punch for the output tape but is not transferred to the output tape since it should not, of course, appear in the middle of the directory line perforations on the ultimate operating tape. Sensing of the carriage return code combination also sets up the special circuit for runover lines and conditions the pivoted reading transmitter to take over the transfer of intelligence to the output tape. When the stationary reading transmitter senses the line feed code combination, its general function is to de-activate the control circuit associated with the stationary reading transmitter. After the line feed code combination has been sensed, the tape in the stationary reading transmitter is advanced to sense the BX code combination at the beginning of the telephone exchange and number. The presence of BX in the master tape following the line feed code combination indicates, to the mechanism, that a normal line is being processed. The master tape is advanced and read, but not transferred to the output tape, until the stationary reader senses the EX code combination at the end of the telephone exchange and number. Sensing of EX causes the tape feed associated with the stationary reading-transmitter to stop after advancing the code combination one unit, and also conditions the circuit to resume transfer of intelligence to the output tape when the punch is free.

As the stationary reading transmitter processes the tape, the tape is advanced to the pivoted-reading transmitter which, as noted earlier, is capable of sensing the code combination adjacent in the tape to that being sensed by the stationary reader. The BX code combination performs the function of starting the distributor associated with the pivoted reader-transmitter when the punch is free. When the punch is free and the BX code combination has been sensed, the pivoted reader-transmitter senses and transfers the exchange and number to the output tape until it senses the EX code combination signifying the end of the exchange. The EX code combination deactivates the distributor clutch of the pivoted reader-transmitter before it is transferred to the output tape and initiates a special carriage return-line feed circuit to insert the code combinations for those functions into the output tape at the end of the exchange information which is the end of the directory line.

Where the name and address portion of the directory line is too long to be accommodated by the directory line, a run-over line condition exists. The run-over line condition is recognized in the stationary reader-transmitter by the absence of the BX code combination following the carriage return-line feed sequence in the master tape. Each time that the line feed code combination is sensed by the stationary reader, the special carriage return-line feed circuit is conditioned for operation. Whereas the BX code combination de-activates this circuit, any other code combination activates it to insert these functions into the output tape at the end of the first line of the run-over line. Another circuit activated by the code combination re-establishes the operating circuit for the stationary reading transmitter to process the second portion of the line after the carriage return-line feed circuit has completed its operation. The transition to the telephone exchange and number portion in the pivoted reader is the same as at the end of a normal line.

Figs. 6 and 7, when considered together as shown in Fig. 8, illustrate the electrical circuits for the double reading transmitter when used in telephone directory composition. In using the double reading transmitter for telephone directory composition, the distributor clutch magnet 206 of the stationary reader 22 is utilized as will be subsequently explained. The distributors of the two readers are wired directly to a six magnet punch 232 rather than to the transmitting line as in the add-thin space embodiment of this application. The multiple magnet punch is old in the art and does not require further description. It has one magnet associated with each code unit and a seventh magnet to initiate the motor driven clutch.

The distributors are wired for simultaneous rather than sequential distribution. Otherwise the double reading transmitter is the same basic unit that was previously described and is illustrated in Fig. 1.

In the stationary reader 22, the reading contacts 296 are wired to recognize line feed (2 marking), the reading contacts 286 are wired to complete a circuit upon the receipt of BX (0, 2, 3, 4 and 5 marking) or a different circuit (shown in dotted lines in Fig. 7) upon the receipt of any other code combination, the reading contacts 276 are wired to recognize EX (0 and 2 marking), and the reading contacts 266 are wired to recognize carriage return (4 marking).

In the pivoted reader 21, the reading contacts 246 and 256 are wired to recognize EX (0 and 2 marking) and BX (0, 2, 3, 4 and 5 marking), respectively.

In the circuit associated with the stationary reader 22, the relay 297 is energized through the reading contacts 296 upon the sensing of the line feed code combination. Its general function is to deactivate the control circuit associated with the stationary reader 22 at the end of the name and address portion of the master tape. The function of the relay 287 is generally to indicate the presence of a "run-over" line in the stationary reader. The absence of the BX signal following the carriage return-line feed sequence will energize the relay 287 through contacts 329, through the alternate path (dotted on Fig. 7) of the reading contact 286.

The relay 288 is operated following the carriage return-line feed sequence by the recognition by the reading contacts 286 of the BX code. The relay 277 is operated through reading contacts 276 by the EX (end of exchange) combination to control the distributor whereby the name and address are transferred to the punch 232. The relay 267 is controlled by the carriage return code combination through the reader contacts 266 and serves the broad purpose of disassociating the distributor of the stationary reader 22 from the punch 232. The relay 233 is controlled by the arrangement of the afore-mentioned relays to connect the distributor of the stationary reader 22 to the punch 232 at the appropriate time and the relay 233 functions only in connection with the "run-over" lines condition to insure proper operation of the stationary reader 22 under these conditions.

In connection with the pivoted reader 21, the relay 257 is controlled by the BX combination through the reading contacts 256 to start transfer of the exchange and number data to the multiple magnet punch 232 while the relay 247 is controlled by the EX combination through the reading contacts 246 for the general purpose of stopping such transfer at the end of the exchange and number portion of the tape.

The relays 236, 237 and 238 constitute a special carriage return and line feed circuit which has the purpose of automatically inserting carriage return and line feed indicia in the appropriate location in the output tape produced by the multiple magnet punch 232, and the relay 239 connects the distributor of the pivoted reader 21 to the multiple magnet punch at the appropriate time.

The above-mentioned and related relays will be described in detail of operation along with the timing contacts and circuits of the present embodiments.

In operation, the manual switch 79 is opened and the telephone directory tape is placed between the two readers so that the EX combination at the beginning of the name listing will be advanced to the reading position on the first operation of the stationary reader 22 and the BX combination of the associated exchange and number is several positions to the right (Fig. 1) of the sensing position of the pivoted reader 21. When the tape is in place, the special start switch 78 is momentarily closed to energize the relay 288 and complete a locking path through make contact 301 and break contact 302 on relay 297. The manual switch 79 is then closed. Energization of the relay 288 also closes the make contact 303 and completes a path from positive battery through break contact 304 and transfer contact 305 to the clutch magnet 202 of the stationary reader 22 thereby causing it to begin its normal sensing operation.

Since the tape is so positioned that the EX combination will be sensed on the first cycle of operation, the relay 277 is energized under control of the timing contact 64 through the recognition of the EX combination by the reading contact 276. The relay 277 finds a locking path through the transfer contact 306 on the relay 267 and its own make contact 307. The make contact 308 on the relay 277 prepares a circuit to the relay 233 which finds operating battery through break contact 309 on relay 236, the break contact 311 on the relay 239, and the manual switch 81, which at this stage has been closed by the operator. The relay 233 is thereby operated to open or close the whole array of contacts associated therewith to perform the following functions: The break contact 312 opens the operating circuit for the relay 239 thereby preventing its activation while the relay 233 is in operation and insuring that only one input can be fed to the magnet punch 232; the make contact 313 closes to complete a circuit from positive battery through the timing contact 69 to the clutch trip of the punch; the make contacts 314 are closed to complete a path from the distributor code contacts 150 through 155 to the magnets controlling the punch interponent of the six magnet punch 232; and the make contact 316 conditions a circuit from plus battery through timing contact 72 to the distributor clutch magnet 206. As a general result of the relay 233 being energized, the distributor of the stationary reader 22 is conditioned to transfer intelligence to the magnetic punch. This transfer of intelligence will continue while the stationary reader 22 reads the name, address and leaders forming part of the first telephone listing being processed.

During the processing by the stationary reader 22, the pivoted reader has been in operation as a result of positive battery being applied to the clutch magnet 207 through the contact 317 on the relay 257 when the manual switch 82 is closed. The pivoted reader 21 continues to read the tape until it encounters the BX code combination at the beginning of the exchange. When the reading contacts 256 recognize the BX code combination a circuit is completed from positive battery through the timing contact 66 to the relay 257 which finds a locking circuit through its make contact 318 and the break contact 319 on relay 247. Energization of the relay 257 prepares the control circuit for the pivoted reader 21 as follows: The transfer contact 317 breaks the circuit to the reader clutch magnet 207 thereby temporarily de-energizing the reader clutch magnet and preparing a circuit for later energization through break contact 312 which, as previously noted, is held open by the operation of the relay 233. The make contact 321 on the relay 257 prepares an operating circuit to the relay 239 which will supply positive battery upon release of the relay 233; and the contact 322 prepares a special path from battery through the make side of the contact 306 to the distributor clutch magnet 209. This circuit will function to start the distributor of the pivoted transmitter 21 wherein it has been waiting for the stationary transmitter 22 to complete its function of processing the portion of tape containing the name and address of a telephone listing.

The stationary transmitter 22 remains in continuous sensing operation until it has transferred the intelligence associated with the name, address, and leaders to the multiple magnet punch and thereby to the output tape. The carriage return code combination (4 marking) at the end of this intelligence is the transition point where control passes from the stationary transmitter to the pivoted transmitter.

When the carriage return code combination is sensed by the stationary transmitter, the relay 267 is momentarily energized from positive battery through the timing contact 64 and the reading contacts 266, to move the transfer contact 306 to its operated position. Operation of the contact 306 removes the locking circuit from the relay 277 and momentarily energizes the distributor clutch magnet 209 through the make contact 322 on the relay 257. The momentary operation of the clutch magnet 209 allows the BX code combination which has been stored in the pivoted reader contacts to be transmitted to the tape where it serves as the "upper rail" indicator for the bold face portion of the exchange. During this period, the release of the relay 277 causes the release of the relay 233 through the opening of make contact 308; causes the de-energization of reader clutch 202 through release of the transfer contact 304 to break the circuit from positive battery through the switch 81; and causes the contact 323 to open the special path to the distributor clutch magnet 206.

The release of the relay 233, as noted above, disconnects the distributor clutch magnet 206 from the multiple magnet punch and also re-establishes a positive battery connection for the control circuit of the pivoted reader-transmitter. The control circuit is established through the break contact 312 which closes, with the release of relay 233, to complete circuits to the reader clutch magnet 207 through contact 317, and to the relay 239 through the make contact 321. The pivoted reader-transmitter 21 is now put into operation with its distributor connected to the punch 232 by virtue of the operation of relay 239. Continued operation of the pivoted reader-transmitter transfers the telephone exchange and numbers to the output tape in its proper sequence, following the name and address which had been transmitted by the stationary reader-transmitter.

In order to establish the conditions, it is necessary to refer once more to the operation of the stationary reader-transmitter as it completes the transfer of the name and address to the output tape.

When the line feed combination is sensed by the stationary reader-transmitter, the run-over line circuit is established as well as the circuit to the pivoted reader-transmitter. The relay 241 is energized for the duration of the timing contact 64 through the reading contacts 296 to close the make contact 324 and complete the circuit through relay 249, the break contact 326 on relay 288, and break contact 327 on relay 287 to put positive battery on both sides of the relay 288 thereby conditioning relay 288 for operation but only after contact 64 opens. As timing contact 64 opens, relay 241 gets locking battery through relay 249 whereupon 249 is operated to close the make contacts 328 and 329 which connect the output circuits of reading contacts to the relays 288 and 287. Operation of either relay 288 or relay 287 will open either contact 326 or 327 to restore the relays 239 and 241 to their unoperated condition until the line feed combination is once more sensed by the stationary reader transmitter. If the line feed code combination is followed by the BX code combination, relay 288 will be energized and a normal line indicated to the mechanism. Any code combination other than BX will cause relay 287 to be energized thereby indicating a run-over line to the mechanism.

As the pivoted reader finishes transferring the telephone exchange and number to the output tape it encounters the EX code combination which signifies the end of exchange. When this occurs, the relay 247 is energized for the duration of timing contact 66 through the reading contacts 246 which are wired to recognize the EX combination. Operation of relay 247 opens break contact 319 thereby releasing relay 257; operates relay 236 by closing make contact 331 which locks up through make contact 332 and break contact 333 on the relay 238, and momentarily closes another of its make contacts 334 which conditions a circuit through make contact 336 on relay 287 for possible energization of relay 234 under the special conditions, to be described later, when the stationary reader identifies the presence of a run-over line.

When the relay 236 is operated, it closes its make contact 337 and prepares a circuit, controlled by timing contact 83, to energize the reader clutch magnet 209, closes its make contact 338 to prepare a circuit, controlled by timing contact 74, to ultimately operate relay 237; closes its make contact 339 to prepare a circuit, controlled by timing contact 68, to punch interponent number 4 of the magnet punch 232; and opens contact 309 to interrupt the path which would otherwise energize relay 233 associated with the stationary reader as a result of the release of relays 239 and 257 as previously noted.

It will be observed that this sequence of events results in the carriage return code being punched in the output tape by the six-magnet punch and that the EX code combination will not be transferred to the tape because the relay 239 was de-energized prior to the time when the punch would be activated by the timing contact 68. As the distributor for the pivoted transmitter continues its cycle, the timing contact 74 is closed to activate the relay 237 through the path previously prepared by relay 236 and finds locking battery through its make contact 342 and break contact 333 of relay 238. Operation of relay 237 closes make contact 343 thereby maintaining positive battery to the distributor clutch magnet 209; closes contact 344 to prepare a circuit from timing contact 77 to relay 238; and operates transfer contact 341 so that during this portion of the distributor cycle, timing contact 84 is connected to the number 2 magnet of the punch to cause a line feed combination (2 marking) to be perforated in the output tape.

Near the end of the distributor cycle the timing contact 77 closes and causes momentary operation of the relay 238 which operates the break contact 333 to unlock the relays 236 and 237 thereby de-energizing the distributor clutch magnet 209. The connection from timing contact 84 is opened and the circuit through manual switch 81, break contact 311 on relay 239, and break contact 309 on relay 236 is re-established so that the circuit elements of the stationary transmitter which obtain power from this source can be placed in operation.

Under conditions where the stationary reader has identified the presence of a run-over line as previously described, the stationary reader is activated to read the names and addresses through the operation of a special circuit established by the operation of the relays 287 and 234. When the stationary reader senses the first character and finds it to be other than BX, relay 287 is energized through the alternate circuit of the reading contact 286 and is locked up through its make contact 346 and contact 363 on relay 297. As a result of relay 287 being energized, the path from the switch 76 to the reader clutch magnet 202 is opened and the clutch magnet 202 is de-energized; the transfer contact 305 is operated to prepare a path for later actuation of the clutch magnet 202; and make contact 336 is closed to prepare an operating circuit to relay 234. The pivoted reader 21 completes its reading and transferring to the EX (end of exchange) code combination. When EX causes relay 247 to be actuated, the carriage return-line feed circuit will be established as previously set forth and the make contact 334 is temporarily closed to operate relay 234 which locks up through contacts 347 and 348. Operation of relay 234 causes circuits to magnetic clutch 206 and to relay 233 through contacts 349 and 351 to be established.

When the carriage return-line feed circuit of the pivoted reader completes its operation, it is deactivated by the momentary energization of relay 238 as previously described and positive battery through switch 81 is applied to the relay 233 through the afore-mentioned make contact 349 on relay 234 and to the clutch magnet 202 through the transfer contact 305 on relay 287 thereby putting the stationary reader 22 into operation and connecting the output to the six magnet punch 232. Simultaneously positive battery, through timing contact 77, is routed to the distributor clutch magnet 206 to transfer the first character which has been stored in the stationary reader while it was in a waiting condition. The stationary reader then proceeds to transfer the code combinations to the output tape until the carriage return and line feed signals are encountered. The line feed code combination actuates the relay 297 to release relay 287 in the same manner as relay 288 is released by breaking the locking circuit through break contact 363. The relay 234 is not, however, released until the stationary reader senses the BX code combination.

The indicated timing may be accomplished in any suitable manner such as cam timing contacts.

*Control of justifying typewriters*

At the present time, it is the practice, when using justifying typewriters or printers, to type the copy once to ascertain the justification necessary for each line and to then retype the copy incorporating the justifications. By using the principles set forth in the foregoing embodiments, it is now possible to control the second operation by means of a perforated tape to thereby cut the labor costs in half.

The preparation of the initial tape is similar to that for the add-fixed space application. The text of the line is perforated first followed by the justification signal indicator (which for purposes of this illustration will arbitrarily be called JU) the justification controls signals, and the carriage return-line feed combination. It is apparent that the justification control signals are thus bracketed by JU at the beginning and carriage return line feed at the end, while the text material is bracketed by the carriage return-line feed combination at the beginning and JU at the end.

It is the function of the stationary reader 22 to recognize the justification control portion of the tape and transmit this intelligence to the appropriate control of the typewriter or printer before initiating the pivoted reader-transmitter to transmit the text of the line.

The pivoted reader-transmitter transmits the text to the appropriate typewriter or printer controls which have been already conditioned by the justification control to produce a justified line of text. When the pivoted reader-transmitter recognizes the JU code combination at the end of the text, it activates the automatic carriage return-line feed circuit to return the carriage and advance the platen of the typewriter or printer and deactivates the transmission from its distributor. The pivoted reader-transmitter continues to sense but not transmit until it recognizes the line feed code combination which transfers the control and operation back to the stationary reader transmitter and stops the sensing operation until the stationary reader-transmitter has transmitted the subsequent justification controls and returns control to the pivoted reader-transmitter as outlined above.

Since the justifying typewriter control is a further embodiment of the preceding embodiments, many of the components are repeated in the circuit diagram in Figs. 9 and 10. Where the same parts are performing substantially the same functions, they are designated by the numerals employed in Figs. 6 and 7 of the telephone directory application.

Referring now to Figs. 9 and 10 the stationary reader-transmitter 22 has two sets of reading contacts 386 and 387 associated with it. The reading contacts 386 are wired to recognize the carriage return code combination while the reading contacts 396 are wired to recognize the JU code combination. The distributor is wired to activate the justification controls. The clutch magnets 202 and 206 as in the preceding embodiment, control the reader and the distributor respectively. The relay 397 is activated through the reading contacts to condition the stationary reader to perform its function of transmitting the justification control signals. The relay 387 is activated through the reading contact 386 at the end of the justification portion of the tape to transfer control from the stationary reader-transmitter to the pivoted reader transmitter. The relay 233 functions in relation to the clutch magnet 206 and timing contact 87 in substantially the same manner as heretofore described. The timing contacts 69 and 71 perform the function of activating the code receiving mechanism in both embodiments. The timing contacts 64, 66, 67 and 68 are for the purpose of supplying positive battery to their associated relays at the proper time in the cycle.

The relay 247, as described in the foregoing embodiment is activated through reading contacts recognizing the code combination at the end of the text material to initiate the automatic line feed-carriage return circuit comprised of relays 236, 237 and 238 and their associated contacts as was previously described. The relay 377 on the pivoted reader-transmitter acts as the control link from the stationary reader-transmitter and the relay 367 is controlled by the line feed code combination to indirectly cause the de-energization of the clutch magnet 207 and return control to the stationary reader-transmitter.

In operation, the prepared tape is positioned to have the stationary reader-transmitter 22 sense the JU code combination between the text material and the justification control code combinations. The pivoted reader-transmitter will not begin to sense the text material until control is transferred from the stationary reader-transmitter at the end of the justification controls. When the stationary reader-transmitter 22 senses the JU code combination, it is recognized by the reading contact 396 to energize relay 397 for the duration of timing contact 64. Relay 397 finds a locking path through its make contact 354 and break contact 355 on relay 387. Relay 397 draws up contacts 356, 357 and 358. Transfer contact 356 removes direct positive battery from the reading clutch magnet 202 and prepares a path to positive battery through contact 311 on relay 239 of the pivoted reader while closure of make contacts 357 and 358 completes operating paths to relay 233 and to distributor clutch magnet 206. Since the pivoted reader-transmitter is waiting, relay 239 is not energized so the break contact 311 completes the circuit to positive battery. The stationary reader-transmitter is now prepared to sense the justification control code combinations and transmit them to the control mechanism of printer or typewriter in a manner similar to that previously described in the foregoing embodiment. The stationary reader-transmitter continues to transmit the justification controls until it senses the carriage return code combination at the end of that portion of the tape. The relay 387 is energized for the duration of the timing contact 64 through reading contacts 386. Operation of relay 387 opens break contact 355 to remove locking battery from relay 397 and thereby reverses the previously described operation; closes make contact 363 to energize relay 377 which locks up through make contact 379 and supplies positive battery to clutch magnet 207 through make contact 378; closes make contact 364 to energize relay 239 which finds a locking path through break contact 370 on relay 236; and opens break contact 365 thereby temporarily breaking the path from positive battery through timing contact 73 and make contact 363 on relay 239 to clutch magnet 209. Operation of relay 239 prepares a circuit to the clutch magnet 209, and removes operating battery from the interlocking control circuits as heretofore pointed out. When the relay 387 is no longer operated through timing contact 64, break contact 365 returns closed to complete a path from positive battery through timing contact 73 to the distributor clutch magnet 209. The pivoted reader-transmitter continues to read and transmit until the JU code combination is recognized by the reading contacts 366 to energize relay 247 for the duration of the timing contact 66 to thereby initiate the automatic carriage return line feed circuit, and transfer control to the stationary reader transmitter. The pivoted reader-transmitter continues to read but not transmit until it senses the line feed code combination which operates relay 367 through the reading contacts 376. Operation of relay 367 draws up break contact 380 to remove locking battery from relay 377. De-energization of relay 377 releases make contact 378 to disconnect positive battery from reader clutch magnet 207 and to thereby stop the pivoted reader-transmitter from further reading until contact is once more transferred from the stationary reader-transmitter 21.

It will be apparent to those skilled in the art that this invention is applicable to other uses such as message switching systems where the message may be perforated before the destination of the message is known to the operator. The address or directory codes can be put at the end of the message and transmitted in the proper sequence by the device of this invention.

While the present invention has been explained and illustrated in specific embodiments, it should be understood that numerous modifications and variations can be made without departing from the spirit or scope thereof.

What is claimed is:

1. In a mechanism for generating a signal from a perforated tape, a first means for sensing indicia in said tape, a first relay circuit controlled by said first sensing means for conditioning a pulse generating circuit in response to a predetermined indicia in the tape, a second means for sensing indicia in said tape, a distributor means controlled by said second sensing means for generating a signal in accordance with the indicia sensed by said second sensing means, and a second relay circuit actuated by said second sensing means ascertaining a preconcerted indicia in said tape for adding said generated pulse to the signal generated in accordance with said preconcerted indicia being ascertained by said second sensing means.

2. A device for selectively altering designated indicia within a predetermined sequence of indicia in a perforated tape comprising, a first means for sensing indicia in said tape, a second means for sensing indicia in said tape, a distributor means for generating a signal in accordance with the indicia ascertained by said second sensing means, a first relay circuit activated by said first sensing means ascertaining a predetermined indicium in said tape for actuating said second sensing means, a second relay circuit similarly activated for conditioning a pulse generating circuit to said distributing means, and a third relay circuit activated by said second sensing means ascertaining said designated indicia in said tape for completing said pulse generating circuit during the generation of the signal corresponding to said designated indicia.

3. A double reading transmitter for automatically adding space band indicia to the indicia for controlling the operation of a typesetting mechanism comprising, a first tape sensing means, a second tape sensing means, means controlled by said first sensing means for actuating said second sensing means, a distributing means controlled by said second sensing means, means operated by the first sensing means ascertaining a predetermined indicia in the tape for generating a pulse, and means for adding said pulse to the signal output of said distributor when said distributor generates a signal in accordance with a predetermined indicia sensed in the tape by the second sensing means.

4. A device for selectively altering designated indicia in a perforated tape within a predetermined sequence of indicia wherein said sequence begins with a first control indicium and ends with either a second or third control indicium comprising, a first means for sensing the indicia in said tape, a second means for sensing indicia in said tape, a distributor meas for generating signals in accordance with the indicia sensed by said second sensing means, a first activating circuit actuated by either said second or third control indicium being ascertained by said first sensing means, an altering circuit for said designated indicia adapted to be established by said second control indicium being ascertained by said first sensing means, a disabling circuit actuated by said first sensing means ascertaining said first control indicia for disabling said first sensing means, and a second activating circuit actuated by said second sensing means ascertaining either said second or third control indicium in said tape for reactivating said first sensing means.

5. In tape controlled typesetting apparatus, means for automatically inserting additional thin spaces in a line in response to add-thin-space indicia at the end of the line comprising, a first reading means, a second reading means, a distributor for generating a signal in accordance with the indicia sensed by said first reading means, an operating circuit actuated by said second reading means ascertaining either the line feed or add-thin-space indicia in the tape for actuating said first reading means, a pulse generating circuit actuated by said second reading means ascertaining the add-thin-space indicia to establish a circuit for adding a pulse to the signal generated from the space indicia, a disabling circuit actuated by said first reading means ascertaining the carriage return indicium for deactivating said pulse generating circuit, and a relay circuit actuated by said first reading means ascertaining either said line feed or said add-thin-space indicium for deactivating said first reading means.

6. A method for reperforating two portions of a line of indicia in reverse order from that which they appear in a perforated tape which consists of operating a reperforator initially in accordance with the second portion of the line in the perforated tape, automatically diverting the signal generated in accordance with the end of the line indicia to establish the control for the operation of the reperforator in accordance with the first portion of the line of indicia, operating the reperforator in accordance with the indicia in the first portion of the perforated tape, and automatically inserting end of the line indicia at the end of the reperforated line.

7. In combination with a signal controlled reperforator a device for automatically rearranging the indicia in a perforated tape comprising, a first sensing means for generating a signal from a first predetermined sequence in said tape, a second sensing means for generating a signal from a second predetermined sequence in said tape, a disabling circuit for disabling said first sensing means, an enabling circuit for conditioning said second sensing means for activation, means controlled by a control portion at the end of said first predetermined sequence for simultaneously actuating said enabling and disabling circuit, and a relay circuit actuated by a control portion at the beginning of said second predetermined sequence for activating said second generating means.

8. In a signal controlled mechanism for automatically reversing a first and second variable length sequence of indicia in a perforated tape and printing them in lines of a predetermined length, a first sensing means adapted to generate a sequence of signals in accordance with said first sequence of indicia, a second sensing means adapted to generate a sequence of signals in accordance with the indicia in said second sequence of indicia, means adapted to automatically insert signals representing control functions into the signal sequence, means for initiating said second sensing means, means actuated by said second sensing means sensing a control indicia following a predetermined number of indicia for actuating said signal inserting means, and means actuated by said second sensing means ascertaining predetermined indicia at the end of said second sequence for actuating said first sensing means.

9. In a mechanism for generating signals in accordance with coded indicia formed in a tape, wherein said indicia is arranged in two sequences, a first means adapted to sense and generate signals in accordance with the second sequence of signals, a second means adapted to sense and generate signals in accordance with the first sequence of signals, means adapted to automatically generate signals representative of control functions, means for initiating said second sensing means into operation, means actuated by said second sensing means sensing a predetermined number of indicia for operating said automatic signal generating means, and means operated by said second sensing means ascertaining a predetermined indicia at the end of said second sequence of signals for actuating said first sensing means.

10. In a mechanism for automatically reversing a first and second variable length sequence of indicia in a perforated tape and printing them in one or more lines of a predetermined uniform length, a first sensing means adapted to operate said mechanism in accordance with the indicia in said first sequence, a second sensing means adapted to operate said mechanism in accordance with the indicia in said second sensing means, a relay circuit actuated by said second sensing means ascertaining a first predetermined indicia in said tape for suppressing operation of said mechanism by said second sensing means, means actuated by said second sensing means ascertaining a second predetermined indicia in said tape for actuating said first sensing means, operating means adapted to operate predetermined control functions in said mechanism and disable said relay circuit, and means actuated by said second sensing means ascertaining any indicia other than said second predetermined indicia for actuating said operating means.

11. A double reading transmitter for transmitting indicia in a different order than that in which it is punched in a perforated tape comprising, a first sensing means, a first distributing means for generating a signal in accordance with the indicia ascertained by said first sensing means, a second sensing means, a second distributing means for generating a signal in accordance with the indicia ascertained by said second sensing means, a first relay circuit actuated by said second sensing means ascertaining a first control code between a first and second predetermined sequence of indicia for actuating said second distributing means, a second relay circuit actuated by said second sensing means ascertaining a second control code at the end of a second predetermined sequence for disabling said second distributing means, a third relay circuit conditioned by said first sensing means ascertaining a third control code at the beginning of said first sequence for actuating said distributing means, and means initiated by said second sensing means ascertaining said second control code for completing said third relay circuit.

12. In a tape control reperforator wherein the control tape contains a sequence of indicia divided into a first and second portion, a first sensing means for generating a signal in accordance with the indicia of the first portion of said sequence, a second sensing means for generating a signal in accordance with the indicia in said second portion, means for actuating said second sensing means, a first control means activated by said second sensing means ascertaining the first indicium of said second portion for operating said reperforator in accordance with the signal generated by said second sensing means, a first relay circuit activated by said second sensing means ascertaining a first end-of-sequence control indicium of said sequence for disabling said first control means, a second relay circuit actuated by said second sensing means ascertaining a last end-of-sequence control indicium for actuating said first sensing means, a second control means activated by said first sensing means ascertaining the first indicium of said first portion for operating said reperforator in accordance with the signal generated by said first sensing means, a third relay circuit for supplying the end of the line indicia signal to said reperforator, and a fourth relay circuit actuated by said first reader ascertaining a predetermined control indicium at the end of said first portion for simultaneously disabling said control means and actuating said third relay circuit, whereby a sequence of indicia is produced in a tape having its portions reversed from those of the control tape and the control indicia properly positioned.

References Cited in the file of this patent

UNITED STATES PATENTS 2,555,734 Dodge ---------------- June 5, 1951